Patented Jan. 11, 1927.

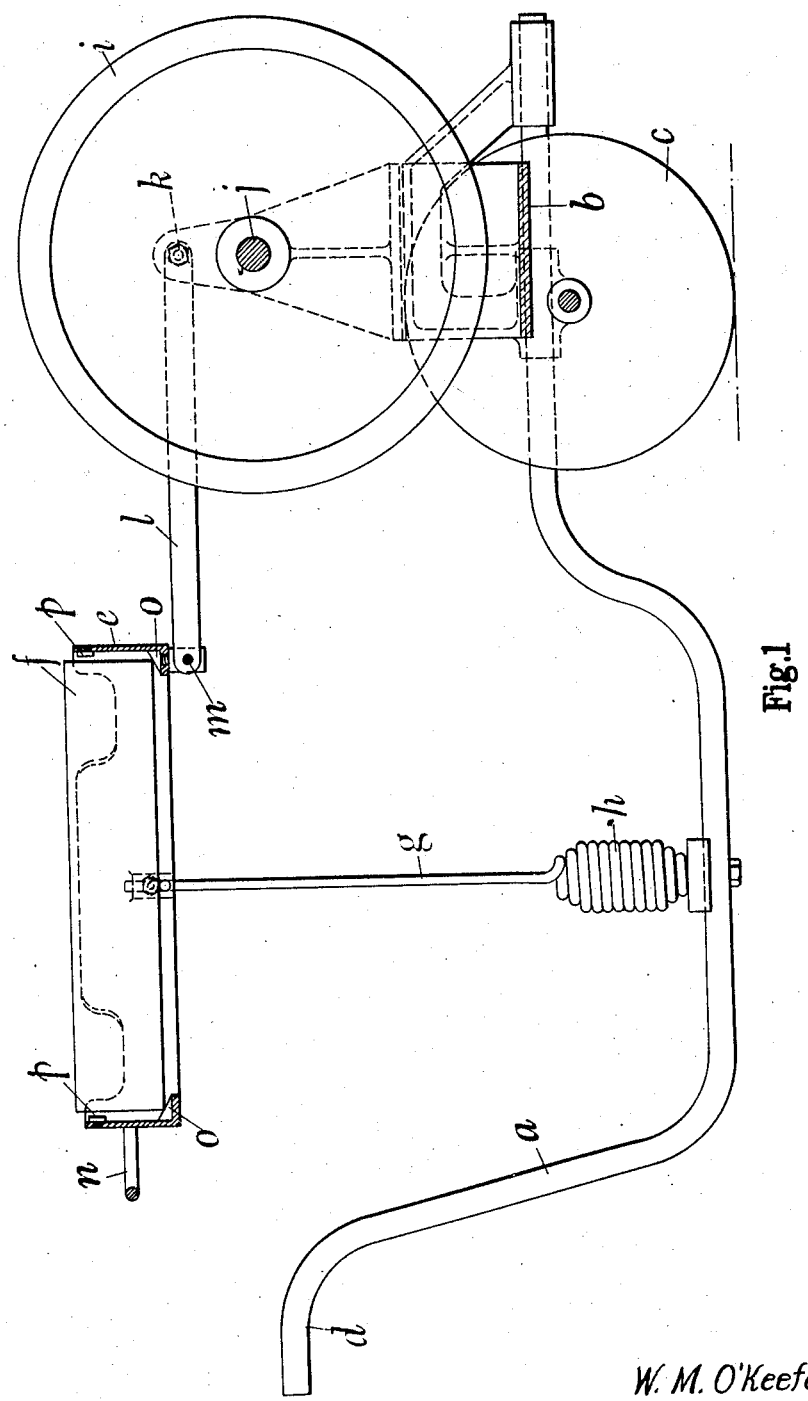

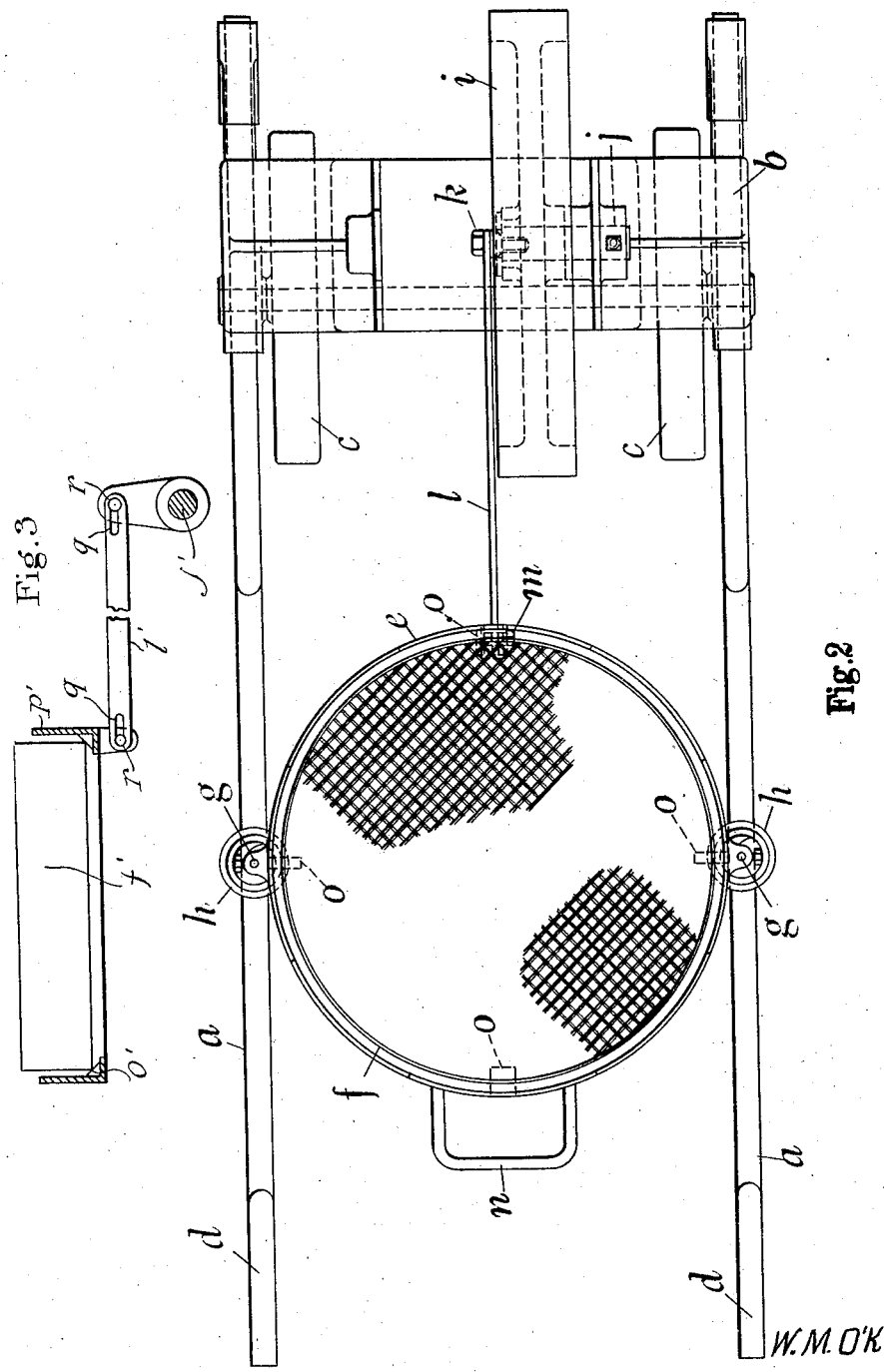

1,614,384

UNITED STATES PATENT OFFICE.

WILLIAM MARTIN O'KEEFE, OF BIRMINGHAM, ENGLAND.

SAND AND OTHER RIDDLE OR SIEVE.

Application filed October 17, 1925, Serial No. 63,084, and in Great Britain November 11, 1924.

This invention relates to sand and other riddles or sieves, and more particularly to sand riddles adapted for foundry purposes, of the kind in which the riddle or sieve is connected to a rotary fly wheel.

The object of the invention is to provide a semi-automatic machine which enables the operation of riddling by hand power to be greatly facilitated.

The invention comprises the combination of a riddle holder adapted to support an ordinary riddle, vertical supports carrying the holder at their upper ends and capable of oscillating about their lower ends, a fly wheel, means for operatively connecting the fly wheel and riddle holder, and means whereby a limited free relative motion can occur between the riddle and holder or between the latter and the fly wheel.

In the two accompanying sheets of explanatory drawings:—

Figure 1 is a sectional side view, Figure 2 a plan of a portable foundry riddling machine constructed in accordance with this invention, and Fig. 3 is a side elevational detail of the modified arrangement for effecting a jolt at the end of each swing of the riddle holder.

Referring to the drawing, a portable frame consisting of a pair of tubular side members $a$, and a cross member $b$ is provided with a pair of ground wheels $c$. The ends $d$ of the members $a$ serve as handles whereby the machine can be wheeled about in the manner of a barrow. A circular riddle holder $e$ into which can be placed an ordinary riddle $f$, is carried at the upper ends of a pair of rods $g$, the lower ends of which are coiled to form springs $h$, which give lateral flexibility to the rods and are secured to the members $a$.

On the cross member $b$ is mounted a freely rotatable fly wheel $i$ supported on one end of a spindle $j$. To one side of the fly wheel is attached by a crank pin $k$ a connecting rod $l$ which is also attached by a pin $m$ to the riddle holder.

A handle $n$ on the riddle holder enables the latter to be oscillated conveniently by the user, and the oscillating motion is accompanied by rotation of the fly wheel. In use the attendant oscillates the riddle holder by hand and thereby energizes the fly wheel. Sand is then placed in the riddle, and the energy of the fly wheel is given out in maintaining the machine in motion. This action is supplemented from time to time by the attendant during the riddling operations.

The riddle does not fit the holder closely but has a limited amount of freedom therein. The riddle may be carried on three or four equally spaced tapered supporting pieces $o$ in the holder, and stop pieces $p$ on the inside of the holder serve as buffers. At the end of each reciprocation of the holder a jolt is imparted to the riddle which augments the riddling action and tends to prevent clogging of the riddle. If desired slots $q$ may be formed in both of the connecting rod ends to receive the pins $r$ aforesaid and produce the jolting action. This provision may be made in addition to or instead of the free arrangement of the riddle in the holder.

A machine as above described is very simple and of relatively low cost, and by its aid the operation of riddling by hand power is greatly facilitated.

When portability is not required the machine may be constructed to operate in a fixed position.

Having thus described my invention what I claim as new and desire to secure by Letters Patent is:—

1. In sand and other riddles, the combination of a riddle holder, a pair of vertical supports having their upper ends connected to the holder and their lower ends movably mounted, and driving means for the riddle holder including a relatively heavy fly-wheel adapted to be initially rotated and store energy, substantially as and for the purposes set forth.

2. In sand and other riddles, the combination of a riddle holder, a pair of vertical supports having their upper ends connected to the holder and their lower ends movably mounted, driver means for the riddle holder including a relatively heavy fly-wheel adapted to be initially rotated upon the oscillation of the riddle holder so as to store energy to continue the oscillation of the riddle holder, and means whereby a lost motion is obtained for the purpose of giving the riddle a jolt at the end of each swing of the holder.

3. An arrangement as claimed in claim 1, wherein means is connected with said fly-wheel and adapted to impart a jolt to the riddle holder at the end of each swing thereof.

In testimony whereof I have signed my name to this specification.

WILLIAM MARTIN O'KEEFE.